(12) United States Patent
Bless et al.

(10) Patent No.: US 8,196,487 B2
(45) Date of Patent: Jun. 12, 2012

(54) PROGRESSIVE GEARING

(75) Inventors: Werner M. Bless, Ruti (CH); Erwin Rott, Ruti (CH)

(73) Assignee: Werner M. Bless, Ruti (CH)

( * ) Notice: Subject to any disclaimer, the term of this patent is extended or adjusted under 35 U.S.C. 154(b) by 1212 days.

(21) Appl. No.: 11/814,766

(22) PCT Filed: Jan. 23, 2006

(86) PCT No.: PCT/EP2006/000559
§ 371 (c)(1),
(2), (4) Date: Jul. 25, 2007

(87) PCT Pub. No.: WO2006/079492
PCT Pub. Date: Aug. 3, 2006

(65) Prior Publication Data
US 2008/0257085 A1    Oct. 23, 2008

(30) Foreign Application Priority Data

Jan. 25, 2005   (CH) .................................. 0108/05

(51) Int. Cl.
*F16H 55/17* (2006.01)
*F16H 1/04* (2006.01)
(52) U.S. Cl. .......................................... 74/437; 74/422
(58) Field of Classification Search ............... 74/406, 74/412 R, 421 A, 422, 424.5, 434, 437, 439, 74/460
See application file for complete search history.

(56) References Cited

U.S. PATENT DOCUMENTS

| | | | | |
|---|---|---|---|---|
| 24,256 A | * | 5/1859 | Wolff ............................ | 100/288 |
| 263,791 A | * | 9/1882 | Leclere ........................... | 74/437 |
| 277,988 A | * | 5/1883 | Burk ................................ | 254/1 |
| 1,151,678 A | * | 8/1915 | Gee ................................. | 74/422 |
| 1,577,770 A | * | 3/1926 | Strid ............................... | 74/437 |
| 2,061,322 A | * | 11/1936 | Massa, Jr. ...................... | 74/89.2 |
| 2,973,658 A | * | 3/1961 | Bishop ............................ | 91/382 |
| 4,516,663 A | * | 5/1985 | D'Alessio et al. ............. | 187/270 |
| 4,530,252 A | | 7/1985 | Sarges et al. | |
| 5,018,469 A | * | 5/1991 | Carlson ...................... | 114/144 R |
| 6,722,222 B1 | * | 4/2004 | Dolan et al. .................. | 74/422 |

FOREIGN PATENT DOCUMENTS

| | | |
|---|---|---|
| DE | 1 146 769 | 11/1956 |
| DE | 26 18 715 | 11/1977 |
| DE | 39 13 809 | 11/1989 |
| DE | 102 25 089 | 1/2003 |
| GB | 2 219 563 | 12/1989 |
| JP | 58009255 A | 1/1983 |
| JP | 04 095570 A | 3/1992 |
| RU | 2142893 C1 | 12/1999 |

OTHER PUBLICATIONS

Japanese Office Action dated Jun. 28, 2011.
Russian Office Action dated Dec. 15, 2009.

* cited by examiner

*Primary Examiner* — Justin Krause
(74) *Attorney, Agent, or Firm* — Fox Rothschild, LLP; Robert J. Sacco (57) ABSTRACT

A progressive gear assembly that is a vehicle steering gear, the assembly comprising at least one spur gear (1, 2) and a toothed structure (3, 4, 5, 7, 8) with which the spur gear (1, 2) meshes. The spur gear (1, 2) has teeth (11) arranged along a curve (10), the curve (10) comprising a radius of curvature (r) which monotonically rises over an angular range of more than 90° of the curve (10). Preferably the curve is a spiral, particularly a logarithmic spiral. This gear assembly is configured compact and simple, features smooth running and achieves a late end point.

30 Claims, 11 Drawing Sheets

PROGRESSIVE GEARING

CROSS REFERENCES TO RELATED APPLICATIONS

This application is a national phase application under 35 USC §371 of application serial No. PCT/EP2006/000559 filed Jan. 23, 2006, which claims the benefit of Swiss (CH) patent application serial number 0108/05 filed on Jan. 25, 2005.

FIELD OF THE INVENTION

The invention relates to a progressive gear assembly comprising at least one spur gear and a toothed structure with which the spur gear meshes, the spur gear comprising teeth arranged along a curve.

BACKGROUND OF THE INVENTION

Progressive gear assemblies find application, for example, in vehicle steering systems, particularly for motor vehicles. It is usually the case that turning the steering wheel is communicated via a steering shaft to a gear wheel meshing with a gear rack. When driven in this way the gear wheel shifts the gear rack which positions the wheels accordingly. With a progressive steering or progressive gear assembly the translation ratio is reduced from a maximum value in a center range of the steering wheel when the steering wheel is turned. This means that in the straight-ahead position of the steering wheel a relatively large turn of the steering wheel produces a small change in direction of the driving track, whereas when maneuvering with the steering wheel already strongly turned, just a relatively small change in turn produces a large change in direction. This is particularly desirable when parking or negotiating a serpentine.

The prior art proposes various solutions for achieving a progressive response of the gear assembly. However, these gear assemblies are structured relatively complicated and are thus correspondingly expensive in manufacture and maintenance. It is also a drawback with gear assemblies comprising a multitude of components that they often exhibit an undesired backlash or that torque fluctuations have to be put up with. In addition to this, the reversing point is attained relatively early.

DE-A-1 146 769 discloses an automotive steering gear with a variable translation ratio, the gear assembly comprising a gear wheel and a gear rack. In this arrangement the gear wheel is configured non-round in an eccentric mounting.

DE-A-39 13 809 proposes a small angle steering device with a pair of elliptical gear wheels.

DESCRIPTION OF THE INVENTION

An object of the invention is to provide a progressive gear assembly for a vehicle steering system, which is relatively small and compact.

The progressive gear assembly in accordance with the invention comprises at least one spur gear and a toothed structure or gear wheel structure meshed by the spur gear. The spur gear comprises teeth which are arranged along a curve. The radius of curvature of the curve increases monotonically over an angular range of more than 90°.

The teeth of the spur gears may thus be arranged along a curve, the radius of curvature of which rises monotonically over an angular range of more than 90° whilst the remaining circumferential portion of the spur gear is configured linear. The remaining circumferential portion, or at least a park thereof, may however also correspond to a curve which may have a radius of curvature which is constant or also falling. Further embodiments are of course possible within the scope of the teaching as described above.

In an embodiment the curve with the monotonically rising radius of curvature is at least portionwise a spiral, the center point of which coincides, in an embodiment, with an axis of rotation or the spur gear.

In an embodiment, this spiral is logarithmic, i.e. it increases the distance away from its center point or pole by the same factor on every revolution.

In some embodiments the toothed structure is at least one gear rack which is ramped. The number of gear racks corresponds, in an embodiment, to the number of spur gears.

Depending on the shape of the spur gears, the gear racks are configured linear ramped or curved ramped. In the case of a logarithmic curved portion of the spur gear the associated portion of the gear rack is, in an embodiment, configured linear. In the case of a circular curved portion of the spur gear the associated gear rack is configured linear and horizontally oriented, when the center point of the circular curved portion is located in the axis of rotation of the spur gear. In the case of another profile of the curved portion of the spur gear the associated portion of the gear rack is configured correspondingly ramped and/or curved.

Thanks to correspondingly adapting the spur gears of pinions and toothed structure, the end point of the rotational motion in each direction is attainable not before ¾ of the revolution of the spur gear or pinion or steering shaft, so that the steering shaft can perform 1½ revolutions from end point to end point. This is achieved particularly by using two or more pinions running on at least two gear racks staggered parallel to each other and arranged one after another at least in part. These arrangements offer furthermore the advantage that no fluctuations in torque occur.

Thanks to the special shape of the gear wheels and gear racks respectively no additional components are needed to achieve a progressive steering gear. The steering shaft can thus be directly secured to the pinion, with the result that a gear assembly with zero backlash is achieved.

In other embodiments the toothed structure is a second spur gear likewise comprising teeth arranged along a curve, the radius of curvature of which increases monotonically over an angular range of more than 90°. In an embodiment, the curve corresponds to a logarithmic spiral. The first spur gear is connectable to a drive shaft, preferably the steering shaft. The second spur gear is connectable to a driven shaft which in an embodiment, drives a conventional rack and pinion system. This embodiment has the advantage that vehicles can now be retrofitted with the progressive gear assembly in accordance with the invention by simple and cost-effective means.

The progressive gear assembly in accordance with the invention comprises a uniform torque profile. By a symmetrical arrangement of the individual components or by using three running lengths for the spur gears, the running lengths being staggered parallel to each other, a symmetrical edge running is now achievable.

The progressive gear assembly in accordance with the invention is particularly suitable for vehicle steering systems of motor vehicles. The assembly is suited both for normal road vehicles and for sports vehicles.

In an embodiment, the radius of curvature of the curve locating the teeth is a minimum where the spur gear comes into contact or meshes with the toothed structure when the steering gear is in its center position. This results in the translation ratio changing relatively slowly with small excursions from the center position, and it results in avoiding that a gear rack meshing with the spur gear needs to have a pronounced cycloidal shape with steep flanks.

Starting from its minimum the radius of curvature of the curve should, in an embodiment, rise monotonously over an angular range of at least 90°, especially at least 180°. This permits a smooth, even change in the translation ratio over this angular range.

In the center position of the steering gear the distance between the axis of rotation of the spur gear and point of contact of the spur gear with the toothed structure is in an embodiment, a minimum so that in this range the response of the steering gear to the steering wheel being turned is slowest.

Further embodiments are apparent from the dependent claims.

BRIEF DESCRIPTION OF THE DRAWINGS

The subject matter of the invention will now be detailed by way of example embodiments as shown in the attached drawings in which:

FIG. 1b is a top view of the gear racks as shown in FIG. 1a;

FIG. 1c is a graph plotting the progression of the gear assembly as shown in FIG. 1a;

FIG. 3b is a top view of the gear racks as shown in FIG. 3a;

FIG. 3c is a graph plotting the progression of the gear assembly as shown in FIG. 3a;

FIG. 4b is a top view of the gear rack as shown in FIG. 4a;

FIG. 4c is a graph plotting the progression of the gear assembly as shown in FIG. 4a;

FIG. 5b is a top view of the gear racks as shown in FIG. 5a;

FIG. 5c is a graph plotting the progression of the gear assembly as shown in FIG. 5a;

FIG. 6b is a top view of the gear racks as shown in FIG. 6a;

FIG. 6c is a graph plotting the progression of the gear assembly as shown in FIG. 6a;

EMBODIMENTS TO PRACTICE THE INVENTION

Figure 1A:
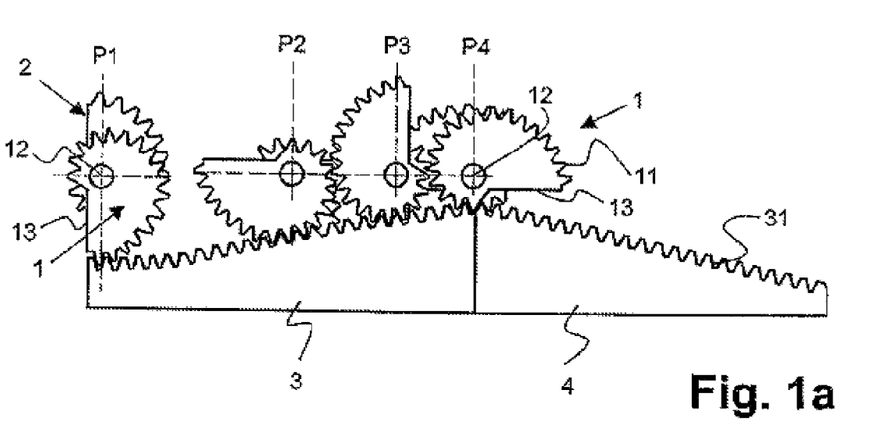
FIG. 1a is a diagrammatic side view of a gear assembly in accordance with the invention having gear wheels and gear racks in a first embodiment.
Figure 1B:
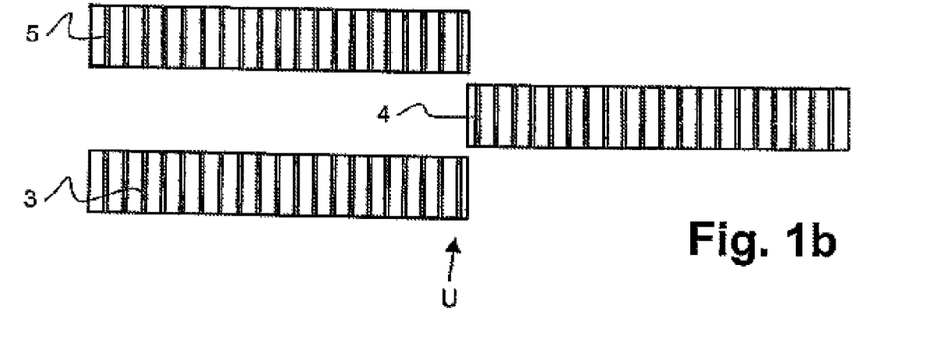

Referring now to FIGS. 1a and 1b there is illustrated a first example embodiment of the progressive gear assembly in accordance with the invention as employed, for instance, in a motor vehicle. The gear assembly comprises at least two, preferably three spur gears 1, 2 rotatable about a common axis of rotation 12. For this purpose the spur gears 1, 2 are connected to a steering shaft (not shown). The steering shaft is turned to the desired rotational position in each case by means of a steering wheel of the vehicle.

Each of the spur gears 1, 2 meshes with a toothed structure in the form of a gear rack 3, 4, 5 while being rolled along the gear racks 3, 4, 5. This results in either the axis of rotation 12 being shifted along a preferably horizontal straight line or the gear racks 3, 4, 5 being shifted correspondingly in their longitudinal direction. The third gear rack 5 provided merely optionally is depicted lighter than the first and second gear racks 3, 4 in FIG. 1b.

In FIG. 1a the two or three spur gears 1, 2 are shown in several turned positions P1, P2, P3 and P4 along the gear racks 4, 5, 6.

Figure 2A:
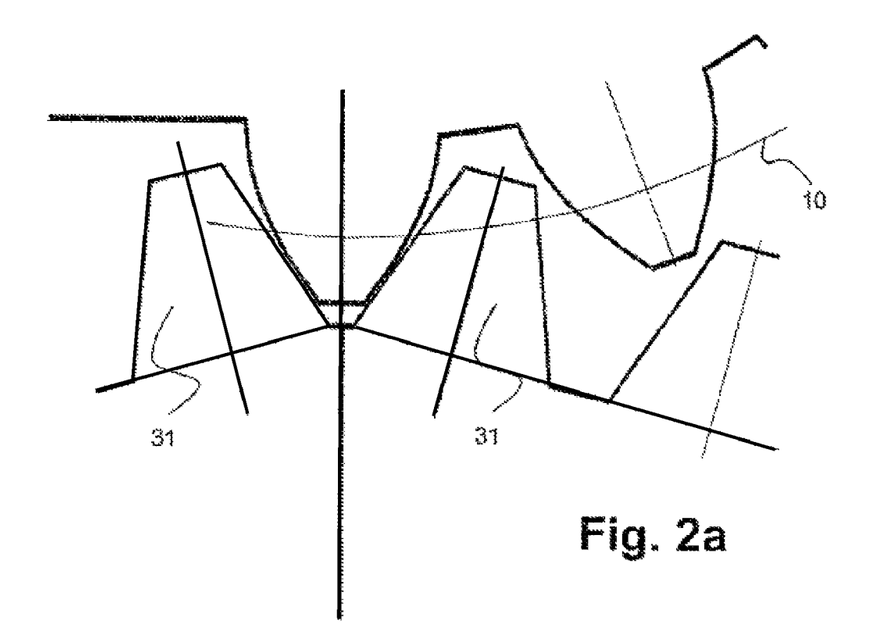
FIG. 2a is a detail view of a gear wheel and a first variant of a gear rack in the region of its apex.

The spur gears 1, 2 comprise teeth 11 arranged along a curve 10 (see FIG. 2a). This curve 10 has a radius of curvature r which rises monotonically over an angular range of more than 90° of the curve and thus of the spur gear 1, 2.

In this example, the teeth are arranged over an angular range of more than 180° and less than 360° on the curve 10, a remaining circumferential portion of the spur gear 1, 2 being configured toothless. In the embodiment as shown in FIGS. 1a and 1b a circumferential portion of approximately 270° features teeth 11 and the remaining portion 13 of the circumference of the spur gear is configured linear.

The center point of the curve 10 in this arrangement remains preferably in a fixed position relative to the spur gear 1, 2 and further preferably coincides with the axis of rotation 12 of the spur gear 1, 2.

In the example embodiment as shown in this case the curve 10 is a spiral, particularly a logarithmic spiral. Its center point coincides preferably with the axis of rotation 12 of the spur gear 1, 2.

The two or three spur gears 1, 2 used in this example embodiment each comprise the same number of teeth and the same curve shape, they otherwise also preferably being configured identical. The first and the second spur gear 1, 2 are however arranged differingly positioned and mirror symmetrical relative to each other. Preferably, their portions having the longest radius of curvature r point in opposite 180° directions whereas the portions having the shortest radius of curvature r point in the same direction. This is best appreciated from FIG. 1a by the positions P1 and P4. The third spur gear is arranged staggered parallel to the first gear wheel 1 and in the same orientation as the first gear wheel 1. Consequently, the third spur gear is not visible in FIG. 1a because it coincides with the first spur gear 1.

The flanks of the individual teeth of the spur gears 1, 2 and gear racks 3, 4, 5 are shaped correspondingly optimized to achieve smooth rolling of the individual gear wheels 1, 2 on the gear racks 3, 4, 5 with minimum friction and noise. This is, however, well known to the person skilled in the art and thus not further detailed in the present context.

The gear racks 3, 4, 5 in this example are configured linear but ramped. The slope achieves, among other things, rolling of the spur gears on the gear racks wherein the axes of rotation of the spur gears remain at a constant level. The gear racks are arranged staggered in parallel and are arranged one after another at least in part. The first and third gear rack 3, 5 in this arrangement are oriented staggered parallel to each other, one alongside the other. Preferably they are configured identical and feature the same slope. Between them, the second gear rack 4 is disposed, the starting portion of which overlaps the end portion of the first and third gear rack 3, 5. It comprises preferably the same slope, but opposite to that of the first and third gear rack 3, 5. In a transitional portion U the gear racks 3, 4, 5 each feature their apex.

The center position of the steering wheel and thus of the gear wheels 1, 2 preferably corresponds to the position P4, i.e. when the gear wheels 1, 2 are at the apex of the gear racks 3, 4, 5. When turning the steering wheel to the left, the positions P3, P2, P1 are passed through. In this process, the first and, where provided, the third first spur gear 1 mesh(es) with the corresponding first third gear rack 3, 5. Depending on their rotational position the gear wheels 1 contact the gear racks in lines or points of contact as are assigned to a monotonically rising radius of curvature of the curve 10. In other words, in position P4 the tooth of the spur gear meshing with the gear rack is assigned the smallest radius of curvature, in position P1 the largest. The middle second gear wheel 2 turns out of mesh with a gear rack in empty space. This turning out of mesh is particularly well evident from FIGS. 1d and 1e.

The radius of curvature r of the curve is a minimum where the gear wheels 1, 2 and the gear racks 3, 4, 5 mesh in the center position of the steering wheel, i.e. in the position P4. But the minimum radius of curvature of the curve is preferably greater than the minimum distance between the curve or the teeth and the axis of rotation 12 so that the gear transmission ratio becomes smaller when the steering wheel is turned from its center position.

Turning the steering wheel to the right causes the first and third gear wheel 1 to turn without meshing whilst the second gear wheel 2 meshes with its corresponding gear rack 4. In this case too, they turn from the smallest radius of curvature to the largest radius of curvature from the center position P4. It is evident from FIG. 1d how one gear wheel each turns meshing with a gear rack whilst the other gear wheel or the other gear wheels turn(s) out of mesh.

Figure 1C:
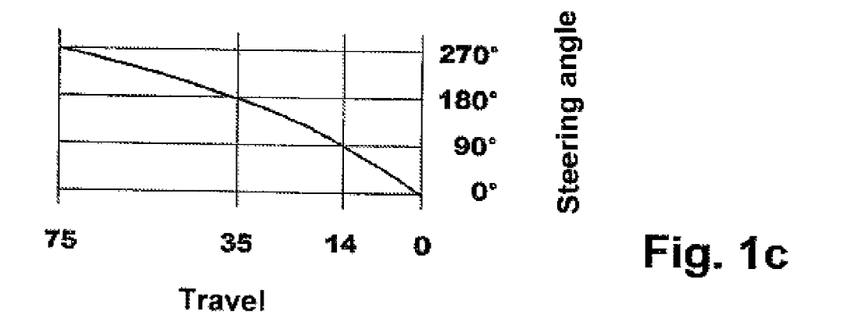
Figure 1D:
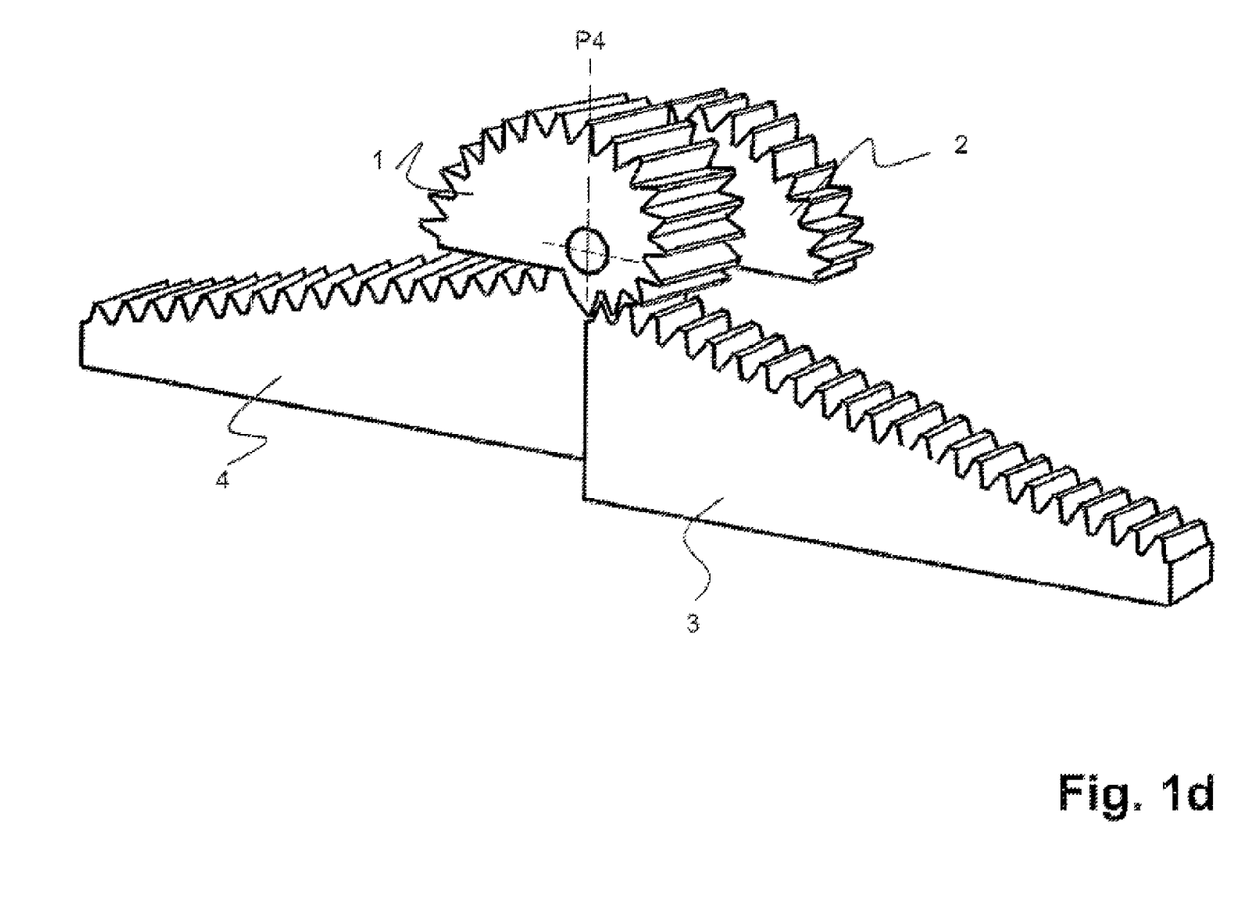
FIG. 1d is a view in perspective of one variant of the gear assembly as shown in FIG. 1a with two gear racks.
Figure 1E:
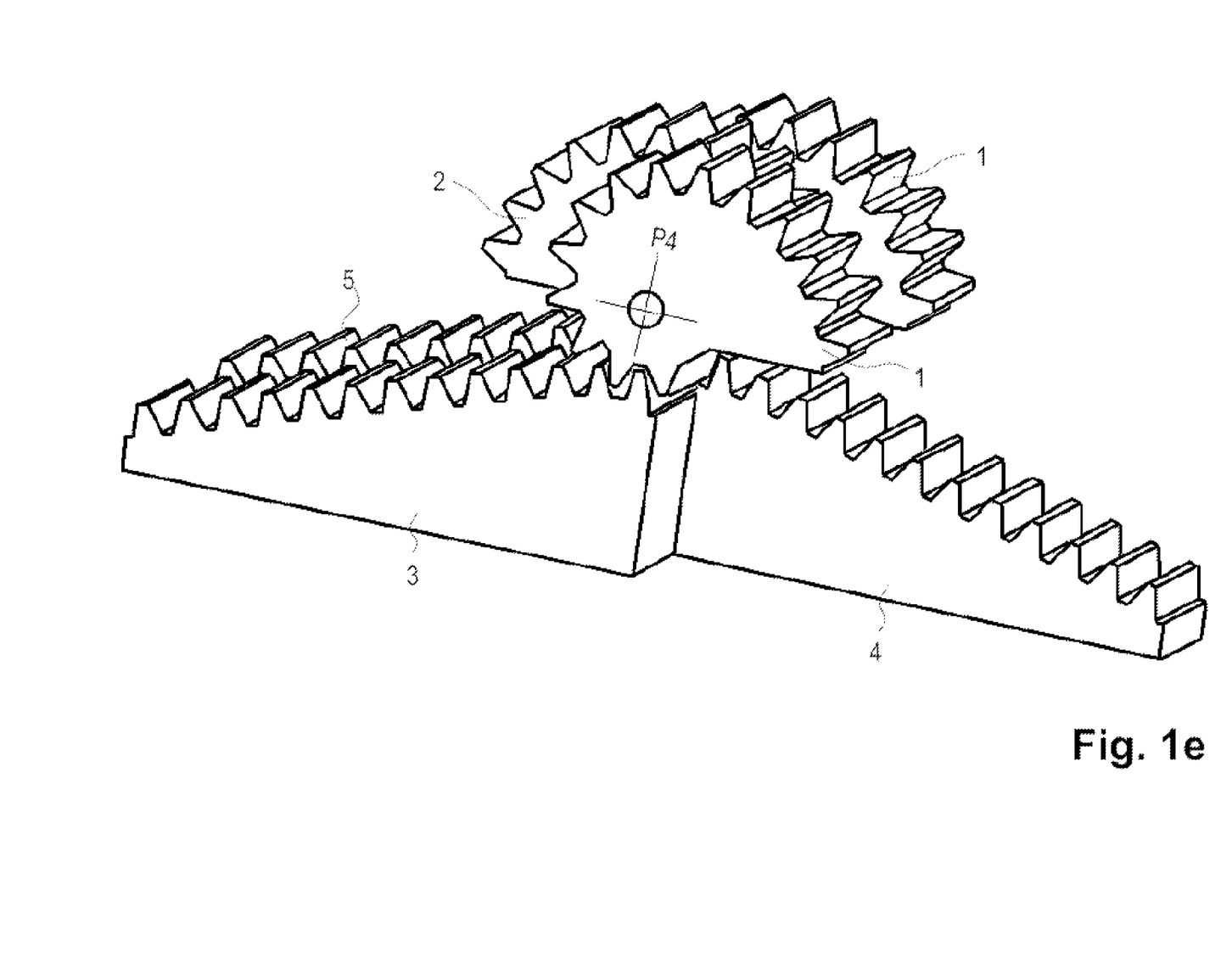
FIG. 1e is a view in perspective of one variant of the gear assembly as shown in FIG. 1a with three gear racks.

The travel achieved by the turning from position P4 to position P1 is shown in FIG. 1c. As is evident, a monotonically increasing travel is achievable over an angular range of 270°. This means that the steering wheel can be turned through 270° until the end point of the gear assembly is reached. Since the steering wheel can be turned in both directions with the same effect, 1½ turns are possible until the respective end points are reached.

Figure 3A:
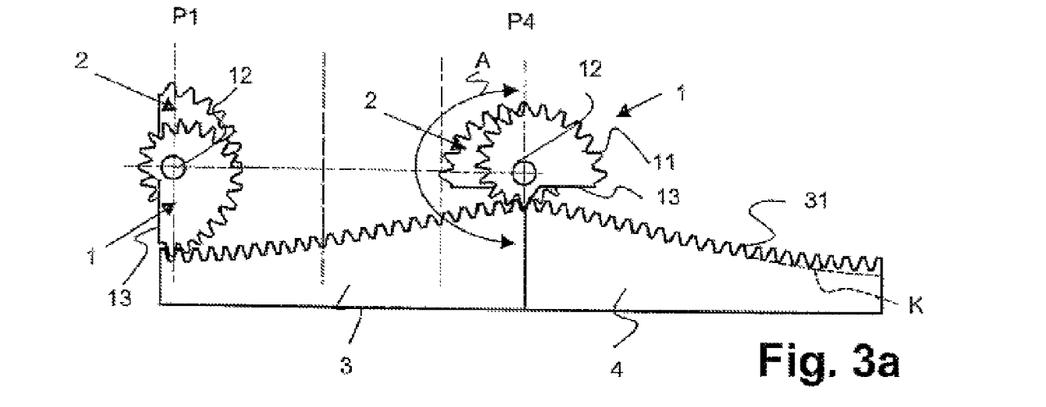
FIG. 3a is a diagrammatic side view of a gear assembly in accordance with the invention having gear wheels and gear racks in a second embodiment.
Figure 3B:
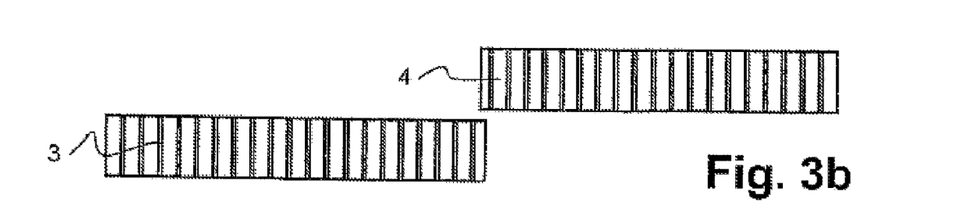

Referring now to FIGS. 3a to 3d there is illustrated a second embodiment of the gear assembly in accordance with the invention using two spur gears 1, 2 and two gear racks 3, 4. In FIG. 3a these two gear wheels are shown in the center position P4 and in one of their two outermost positions P1. In this case the teeth of the spur gears 1, 2 are arranged over an angular range A of approximately 180° along a logarithmic spiral. In the adjoining angular range of somewhat more than 90° the curve features a radius of curvature which still rises monotonically, but the curve no longer corresponds to a logarithmic spiral. The circumference in the remaining angular range is in turn configured linear. In this arrangement the spur gears 1, 2 are mounted on their axis of rotation 12 so that in the neutral position of the steering wheel, i.e. in the region of the apex of the first and second gear rack 3, 4 first the range having the shape of a logarithmic spiral is robed off.

Adapted to the shape of the spur gears 1, 2 are the gear racks 3, 4, firstly, i.e. starting from their apex, configured linear ramped before translating into a ramped but curved line K.

Figure 3C:
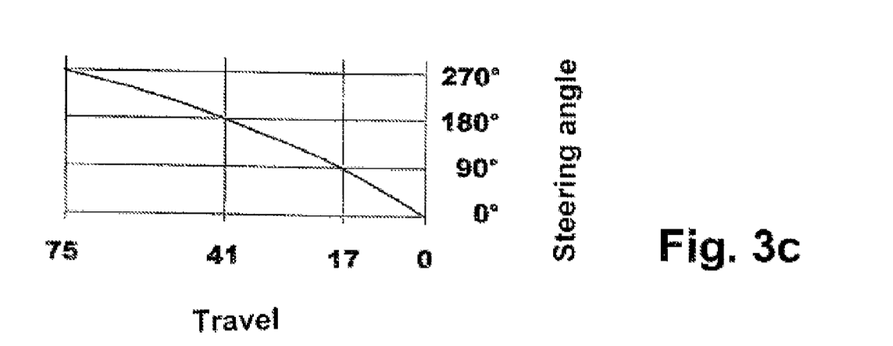

Shown in turn in FIG. 3c is the travel as a function of the steering angle. As compared to the first embodiment as shown in FIGS. 1a to 1c the plot is less curved in the angular range of 180° to 270°.

Figure 4A:
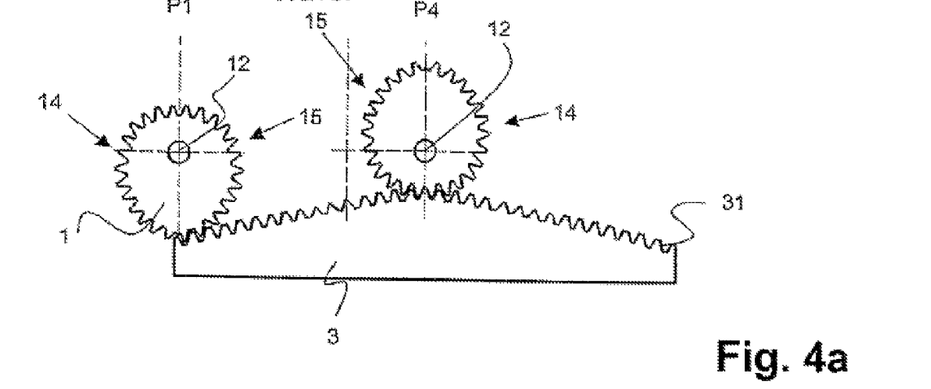
FIG. 4a is a diagrammatic side view of a gear assembly in accordance with the invention having gear wheels and gear racks in a third embodiment.
Figure 4B:
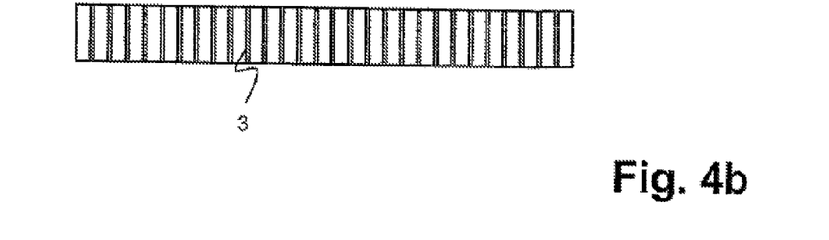
Figure 4C:
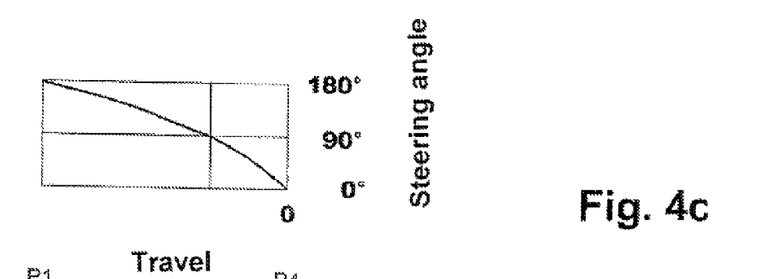

Referring now to FIGS. 4a and 4c there is illustrated an embodiment comprising just one spur gear 1 and just one gear rack 3, the first gear wheel 1 being shown in turn in its center position P4 and in one of its two outermost positions P1. The teeth 11 of the spur gear 1 are arranged symmetrical on the curve as regards positive and negative revolution of the gear wheel 1, starting from its center position. The teeth 11 can be grouped into two groups of teeth 14, 15. Each group or teeth 14, 15 is to be assigned a curve 10. The two curves 10 each cover an angular range of 180°. They are arranged mirror symmetrical with respect to a plane in which the axis of rotation 12 is located, and they comprise the same center point which preferably coincides with the axis of rotation 12. However, they are arranged in opposite directions. The result is an "egg-shaped" gear wheel in which the transition from one curve into the other is continual, resulting in each largest and smallest radius of curvature coinciding. If the two curves of the gear wheel 1 are each a logarithmic spiral, the gear rack 3 is in turn configured linear in being ramped in both directions, starting from the neutral position as the apex. As evident from FIG. 4c the excursion to each side is 180°, but the gear features a minimum number of components in thus achieving a correspondingly compact and space-saving configuration. Furthermore, the production is cost-effective.

Figure 5A:
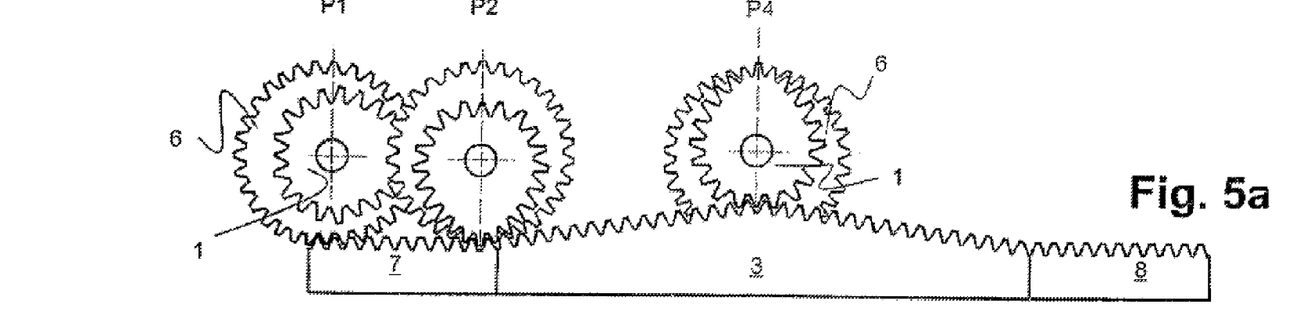
FIG. 5a is a diagrammatic side view of a gear assembly in accordance with the invention having gear wheels and gear racks in a fourth embodiment.
Figure 5B:
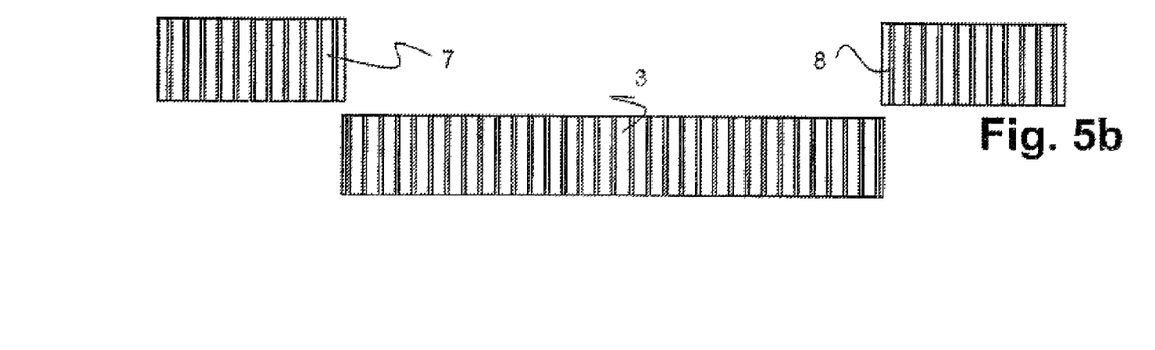
Figure 5C:
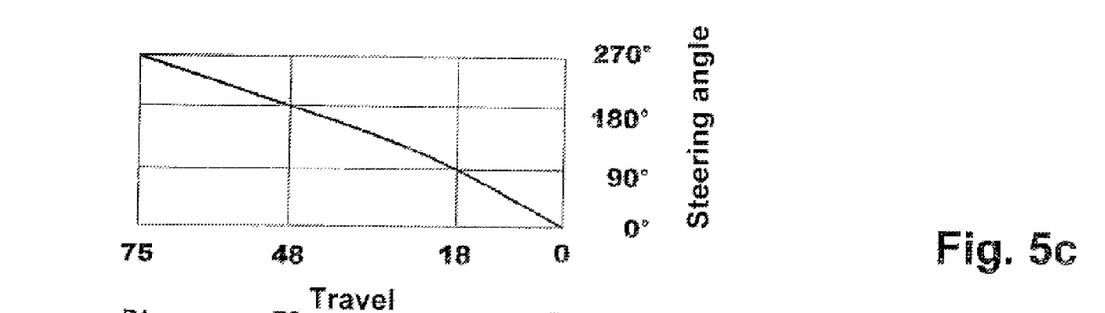

Referring now to FIGS. 5a to 5c there is illustrated an embodiment including again two spur gears 1, 6 and at least three gear racks 3, 7, 8 arranged at least partly one after the other and at least partly staggered in parallel to each other. The gear wheels 1, 6 are shown in three positions P1, P2, P4. The first gear wheel 1 is a gear wheel the same as the embodiment as shown in FIG. 4a and the gear rack 3 belonging to the first gear wheel 1 is configured linear and ramped in both directions. The teeth of the second gear wheel 6 are arranged on a circle or elipse. This gear wheel 6 meshes with two gear racks 7, 8. The teeth of these as racks 7, 8 are arranged along a horizontal and straight line. Starting from the center position P4 the gear wheels mounted in common can turn to the right or to the left. In FIG. 5a the individual positions are shown for a revolution to the left. To begin with, the spiral gear wheel 1 meshes with the associated ramped gear rack 3, and the round gear wheel 6 rotates out of mesh. As soon as the 180° turned position is attained the ramped gear rack 3 ends and the spiral gear wheel 1 rotates out of mesh. Instead, thanks to the overlapping portion of the two gear racks 3, 7, the round gear wheel 6 has taken over and now meshes with the first linear gear rack 7 over a further angular range of at least 90°. In a rotation to the right the round gear wheel 6 meshes with the second straight gear rack 8 arranged as a linear elongation of the first linear gear rack 7 but with longitudinal spacing. As evident from FIG. 5c the end point in this arrangement is reached not before 270° per turning direction, the travel being linear in the steering angular range of 180° to 270°. For greater excursions the characteristic of the travel can be selected by using instead of the round gear and the straight gear rack correspondingly adapted curve shapes as explained by way of the example as shown in FIGS. 3e to 3d. In addition to this, the horizontal configured portion of the gear rack can be elongated as required to permit several revolutions in a variant of this arrangement. This variant is particularly suitable for commercial vehicles.

Figure 6A:
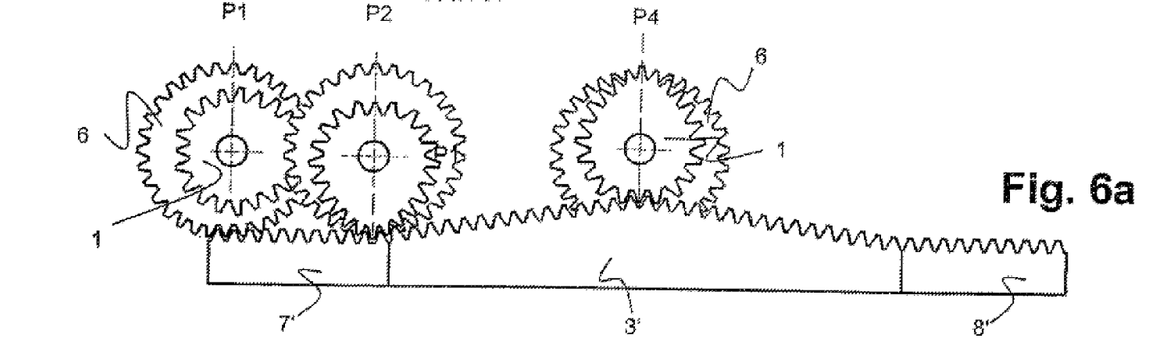
FIG. 6a is a diagrammatic side view of a gear assembly in accordance with the invention having gear wheels and gear racks in a fifth embodiment.
Figure 6B:
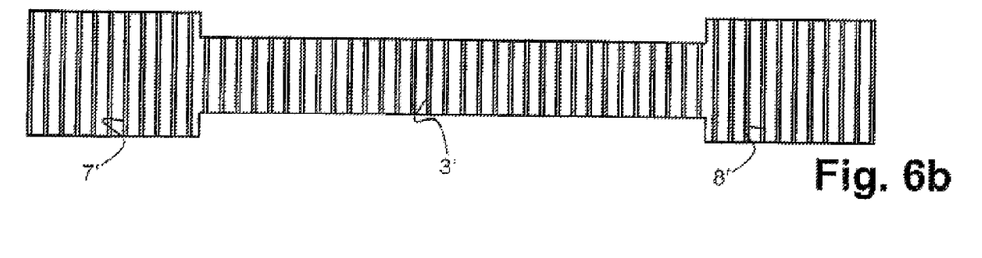
Figure 6C:
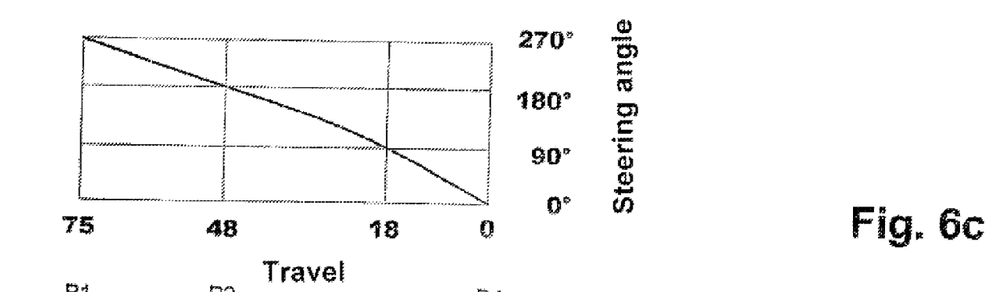

Referring now to FIGS. 6a to 6c there is illustrated an example embodiment substantially corresponding to that as shown in FIGS. 5a to 5c. However, in this case the two straight gear racks are not configured as separate units, but integrated with the ramped gear rack or at least connected thereto. This results in a gear rack that comprises at least one, and in this case two, broad portions 7', 8' and a middle narrow portion 3'. Depending on the rotational orientation of the steering shaft and thus the gear wheels 1, 6, the spiral shaped gear wheel 1 meshes with the narrow portion 3' or the round gear wheel 6 meshes with one of the broad portions 7', 8'. In FIG. 6b it is evident how the gear rack is widened at both ends. This shape is recommended when instead of a round gear wheel 6 two round gear wheels are used arranged at one side each of the spiral shaped gear wheel 1. This again ensures in turn a symmetrical run of the edges.

Figure 7A:
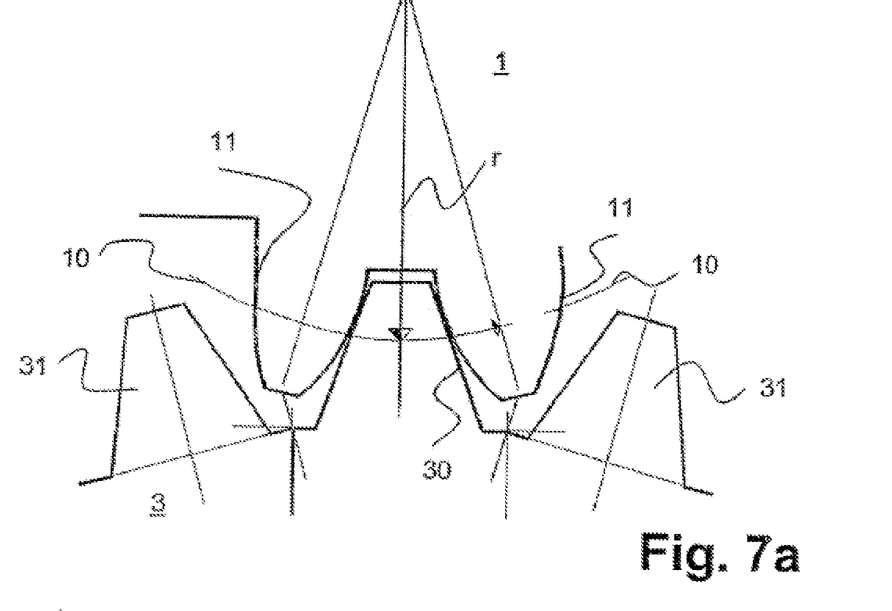
FIG. 7a is a detail view of a gear wheel and of a second variant of a gear rack in the region of its apex.
Figure 7B:
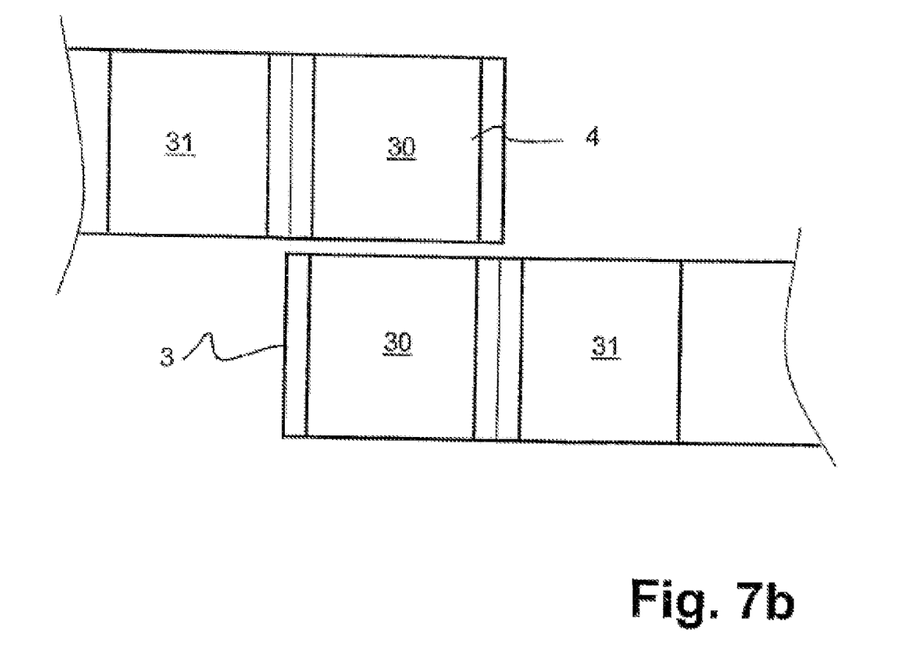
FIG. 7b is a detail of the gear rack as shown in FIG. 7a from above.

The apex of the gear rack can be configured in different ways. A first variant is illustrated in FIGS. 7a and 7b. In this variant, the apex is provided with a middle tooth 30, wherein in this example both gear racks—or when three gear racks are provided, all three gear racks—feature such a middle tooth 30. This arrangement permits smooth running.

Figure 2B:
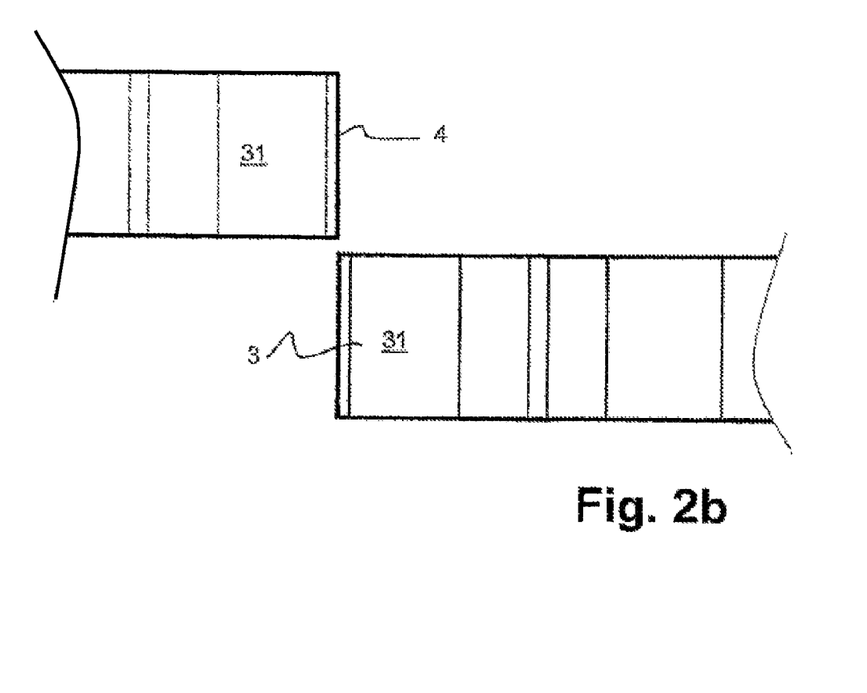
FIG. 2b is a detail of the gear rack as shown in FIG. 2a from above.

Shown in FIGS. 2a and 2b is another variant of the configuration of the apex of the gear racks. In this variant, no middle tooth is provided, but instead each gear rack ends with a tooth 31 configured skew, the angle and distance of which to the next tooth of the same gear rack corresponding to the arrangement of the remaining teeth of this gear rack. In this arrangement, the one gear rack ends before the other begins, i.e. no overlapping teeth are provided. This variant is simple to produce.

Figure 8A:
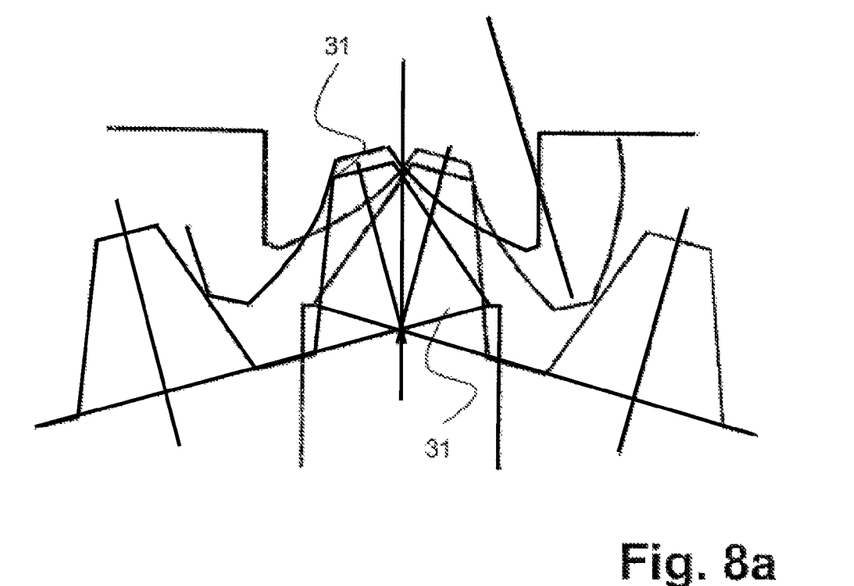
FIG. 8a is a detail view of a gear wheel and of a third variant of a gear rack in the region of its apex.
Figure 8B:
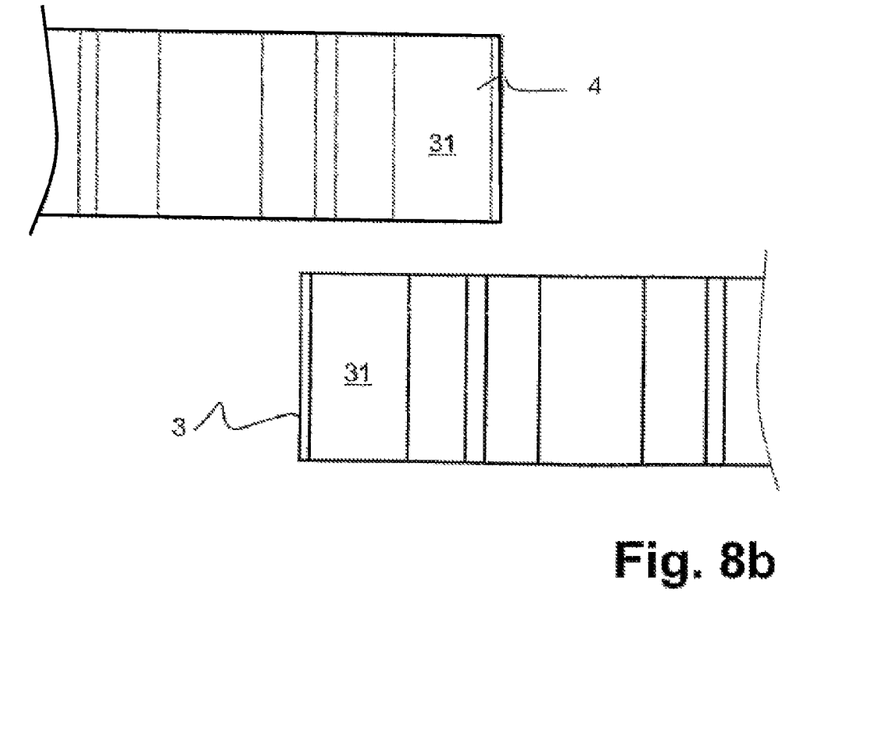
FIG. 8b is a detail of the gear rack as shown in FIG. 8a from above.

In the configuration of the apex according to FIGS. 8a and 8b, the gear racks are shaped the same as the above example embodiment, i.e. the uppermost teeth 31 are configured skew and correspond to the remaining teeth. But in this case they overlap with the uppermost tooth 31 of the adjoining gear rack. This variant has the advantage that it is again simple to produce, but that the rolling of the pinions is smoother than in the variant as shown in FIGS. 2a and 2b.

Figure 9A:
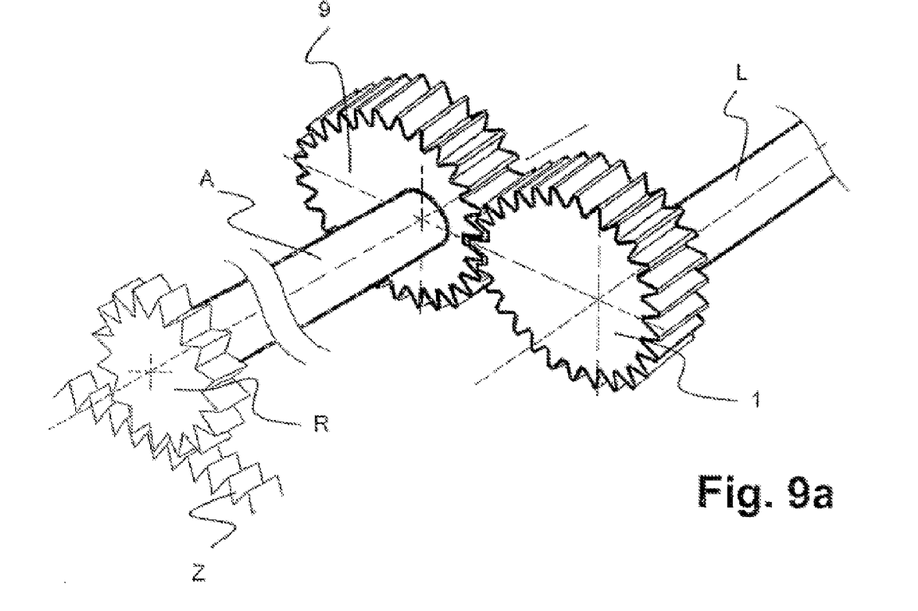
FIG. 9a is a view in perspective of a gear assembly in accordance with the invention in a sixth embodiment.
Figure 9B:
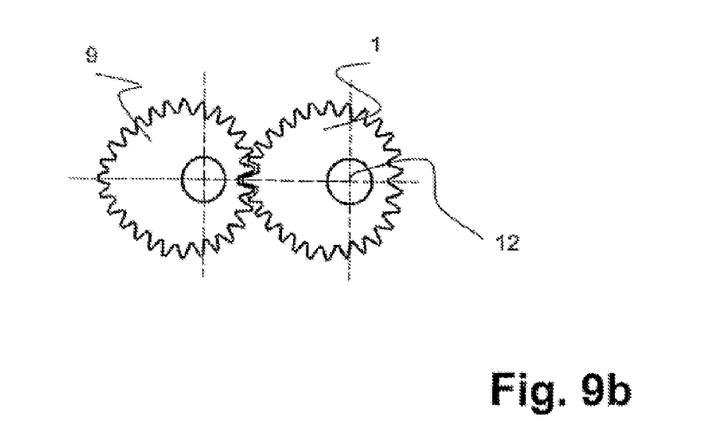
FIG. 9b is a diagrammatic view of the gear wheels as shown in FIG. 9a from above.

Referring now to FIGS. 9a and 9b there is illustrated an embodiment which differs from the previous embodiments particularly by the toothed structure not being a gear rack but a further spur gear, a driven gear wheel 9. The spur gear 1 is connected via the drive or steering shaft L (shown here only in part) to the steering wheel and corresponds to a drive gear. This is connected via a driven shaft A to a pinion R and a gear rack Z of a conventional rack-and-pinion gear.

The drive gear wheel 1 has preferably the same shape as the gear wheel shown in FIG. 4a, and therefore it is not again described in detail. It meshes by its teeth 10 with the driven gear wheel 9 which is preferably likewise configured as the gear wheel shown in FIG. 4a in thus has the same shaped curve and the same number of teeth as the drive gear wheel 1. Preferably the two spur gears 1, 9 are configured identical, each of which may comprise two logarithmic spirals or other curves of another shape as long as the radii of curvature of the curves monotonically rise over an angular range of 90°, each supplementing the other. In the example as shown here the center points of the curves coincide in turn with the axes of rotation of the corresponding gear wheels. Incidentally, they are shown in FIGS. 9a and 9b in a rotational position which does not correspond to the center position of the steering wheel but a position turned through 180°.

In the examples as described above the center points of the curves each coincide with the axes of rotation of the gear wheels. In addition, the axes of rotation are also mounting axes of the gear wheels. These are some exemplary embodiments. However, it is just as possible to mount the gear wheels otherwise, or to arrange the axes of rotation outside of the center points of the curves. As mentioned above, the logarithmic spiral is the preferred shape of the curve, but here too, other curves are just as possible comprising a monotonically increasing radius of curvature over an angular region of at least 90° as long as the gear rack or the further gear wheel meshing with the gear wheel is shaped correspondingly adapted. It is furthermore to be noted that also combinations of the teaching of individual embodiments are possible and are covered by this disclosure.

| List of reference numerals | |
|---|---|
| 1 | first spur gear |
| 10 | curve |
| 11 | tooth |
| 12 | axis of rotation |
| 13 | remaining portion |
| 14 | first group of teeth |
| 15 | second group of teeth |
| 2 | second spur gear |
| 3 | first gear rack |
| 3' | narrow portion |
| 30 | middle tooth |
| 31 | teeth |
| 4 | second gear rack |
| 5 | third gear rack |
| 6 | round gear wheel |
| 7 | first straight gear rack |
| 7' | broad portion |
| 8 | second straight gear rack |
| 8' | narrow portion |
| 9 | driven gear wheel |
| A | driven shaft |
| L | steering shaft |
| R | pinion |
| Z | gear rack |
| r | radius of curvature |
| P1, P2, P3, P4 | turned position |
| U | overlapping portion |
| K | curved line |

The invention claimed is:

1. A progressive gear assembly, the gear assembly comprising:
    at least one spur gear; and
    a toothed structure with which the spur gear meshes, the toothed structure comprising at least one gear rack,
    wherein the gear assembly is a vehicle steering gear;
    wherein the spur gear comprises teeth arranged along a curve, the curve comprising a radius of curvature which monotonically increases over an angular range of more than 90° of the curve; and
    wherein the radius of curvature is a minimum in a region where, in a center position of the steering gear, the spur gear contacts the toothed structure.

2. The gear assembly as set forth in claim 1 wherein the curve of the spur gear is a spiral.

3. The gear assembly as set forth in claim 2, wherein the curve is a logarithmic spiral at least portionwise.

4. The gear assembly as set forth in claim 2, wherein the curve is a logarithmic spiral over at least an angular range of 90°.

5. The gear assembly as set forth in claim 1, wherein the spur gear is rotatable about an axis of rotation and the curve comprises a center point which coincides with the axis of rotation of the spur gear.

6. The gear assembly as set forth in claim 1, wherein the teeth are arranged over an angular range of more than 180° and less than 360° on the curve and a remaining circumferential portion of the spur gear is configured toothless.

7. The gear assembly as set forth in claim 1 wherein the spur gear comprises a first and a second group of teeth, the first and the second group of teeth each being arranged along a first and a second curve respectively, the first and the second curve each extending over an angular range of the spur gear of 180°, the two curves being minor symmetrical.

8. The gear assembly as set forth in claim 1, wherein the gear assembly comprises a further spur gear in addition to the spur gear, the teeth of the further spur gear being arranged on a circle.

9. The gear assembly as set forth in claim 1, wherein the at least one gear rack is configured ramped.

10. The gear assembly as set forth in claim 9 wherein the at least one gear rack comprises a middle tooth at its apex.

11. The gear assembly as set forth in claim 1, wherein at least two gear racks are arranged at least in part one after another and staggered parallel to each other, at least two spur gears being provided, one spur gear of which meshes with one gear rack each.

12. The gear assembly as set forth in claim 11 wherein the at least two gear racks arranged at least in part one after another comprise opposing ramps, each having an apex in a portion adjoining each other.

13. The gear assembly as set forth in claim 1, wherein the gear assembly comprises at least one further spur gear in addition to the spur gear, the at least one gear rack comprises at least one broad and at least one narrow portion, and wherein, depending on a position of the spur gear, the spur gear meshes with the narrow portion or the further spur gear meshes with the broad portion.

14. The gear assembly as set forth in claim 1, wherein the at least one gear rack comprises teeth arranged linearly.

15. The gear assembly as set forth in claim 1, wherein the at least one gear rack comprises teeth arranged along a curved line.

16. The gear assembly as set forth in claim 1, wherein the radius of curvature of the curve, starting with a minimum radius of curvature monotonically rises over an angular range of at least 90°.

17. The gear assembly as set forth in claim 1 wherein in a center position of the steering gear the distance between an axis of rotation of the spur gear and a contact range of the spur gear with the toothed structure is a minimum.

18. The gear assembly as set forth in claim 1, wherein the teeth are arranged over an angular range of roughly 270° on the curve and a remaining circumferential portion of the spur gear is configured toothless.

19. The gear assembly as set forth in claim 1, wherein the radius of curvature of the curve, starting with a minimum radius of curvature monotonically rises over an angular range of at least 180°.

20. A progressive gear assembly, comprising:
   at least a first spur gear;
   a second spur gear; and
   a toothed structure with which the first spur gear and the second spur gear mesh, the toothed structure comprising at least one gear rack;
   wherein the gear assembly is a vehicle steering gear;
   wherein the first spur gear has an axis of rotation and the second spur gear has an axis of rotation and the axes of rotation of the first and second spur gears are co-axial;
   wherein the first spur gear comprises teeth arranged along a first curve and the second spur gear comprises teeth arranged along a second curve; and
   wherein each of the first curve and the second curve comprises a respective radius of curvature which monotonically increases over an angular range of more than 90° of the respective curve.

21. The gear assembly as set forth in claim 20, wherein, in a center position of the steering gear, at least one of the first curve and the second curve has a minimum radius of curvature in a region in which the respective spur gear contacts the toothed structure.

22. The gear assembly as set forth in claim 20, wherein the first spur gear and the second spur gear are mirror symmetrical.

23. The gear assembly as set forth in claim 20, wherein a region of the first spur gear has a minimum radius of curvature and a region of the second spur gear has a minimum radius of curvature are arranged in the same direction.

24. The gear assembly as set forth in claim 20, wherein a third spur gear having an axis of rotation is arranged co-axially with the axes of rotation of the first and second spur gears and so that the first spur gear and the third spur gear coincide and are staggered parallel to each other.

25. The gear assembly as set forth in claim 24, wherein the toothed structure comprises a first rack meshing with the first spur gear and a second rack meshing with the second spur gear and a third rack meshing with the third spur gear.

26. A progressive gear assembly, comprising:
   a first, a second and a third spur gear each having an axis of rotation, wherein the second spur gear is arranged between the first spur gear and the third spur gear and the axes of rotation are co-axial; and
   a first rack, a second rack and a third rack, which are arranged staggered parallel to each other and at least partly one after the other;
   wherein the gear assembly is a vehicle steering gear;
   wherein the first spur gear is adapted to mesh with the first rack, the second spur gear is adapted to mesh with the second rack, and the third spur gear is adapted to mesh with the third rack;
   wherein the third spur gear is arranged at its axis of rotation staggered parallel and coinciding with the first spur gear; and
   wherein the first rack and the third rack are configured identically.

27. The gear assembly as set forth in claim 26, wherein at least one of the spur gears comprises a plurality of teeth, the teeth being arranged along a curve, wherein the curve comprises a radius of curvature which monotonically increases over an angular range of more than 90° of the curve.

28. The gear assembly as set forth in claim 26, wherein:
   in first positions of the steering gear the first spur gear meshes with the first rack and the third spur gear meshes with the third rack, and the second spur gear turns out of mesh in empty space, and wherein
   in second positions of the steering gear the second spur gear meshes with the second rack, and the first and third spur gears turn out of mesh.

29. The gear assembly as set forth in claim 26, wherein the first spur gear and the second spur gear are arranged mirror symmetrical relative to each other on the co-axial axes.

30. The gear assembly as set forth in claim 26, wherein the first and third racks have the same slope, and wherein the second rack has a slope that is opposite to that of the first and third racks.

* * * * *